United States Patent [19]

White

[11] 4,271,712
[45] Jun. 9, 1981

[54] VARIABLE SPEED DRIVE UNIT

[76] Inventor: Herbert O. White, 4242 E. Wilshire Dr., Phoenix, Ariz. 85008

[21] Appl. No.: 31,829

[22] Filed: Apr. 20, 1979

[51] Int. Cl.³ ............................................. F16H 27/02
[52] U.S. Cl. ........................................ 74/141; 280/251
[58] Field of Search ........................ 74/137, 140, 141; 280/236, 238, 251, 253, 255, 258

[56] References Cited

U.S. PATENT DOCUMENTS

| 494,203 | 3/1893 | Herrington | 185/10 |
|---|---|---|---|
| 584,200 | 6/1897 | Wheatley | 280/255 |
| 595,661 | 12/1897 | Smith | 74/137 |
| 643,647 | 2/1900 | Harmon | 280/232 |
| 651,021 | 6/1900 | Silvey | 185/9 |
| 837,815 | 12/1906 | Esch | 185/9 |
| 914,926 | 3/1909 | Comfort | 185/13 |
| 949,951 | 2/1910 | Zieg | 185/10 |
| 3,375,023 | 3/1968 | Cox | 280/251 |
| 3,661,404 | 5/1972 | Bossaer | 280/258 |
| 3,760,905 | 9/1973 | Dower | 185/2 |
| 3,834,733 | 9/1974 | Harris | 280/251 |
| 4,019,230 | 4/1977 | Pollard | 280/255 |

Primary Examiner—C. J. Husar
Assistant Examiner—Conrad Berman
Attorney, Agent, or Firm—Don J. Flickinger

[57] ABSTRACT

An elongate flexible power transmission member, stationarily affixed at one end and secured to tension biasing means at the other end, is engaged with a unidirectional drive mechanism. Reciprocating power input means angularly deflect a section of the power transmission means, causing reciprocal movement of the power transmission means and urging rotation of the unidirectional drive mechanism. The drive ratio between the length of the stroke of the reciprocating power input means and the degree of rotation of the unidirectional drive mechanism is controlled by a pair of extendibly and retractably movable guides engaged with the power transmission member for determining the section thereof subject to angular deflection.

8 Claims, 8 Drawing Figures

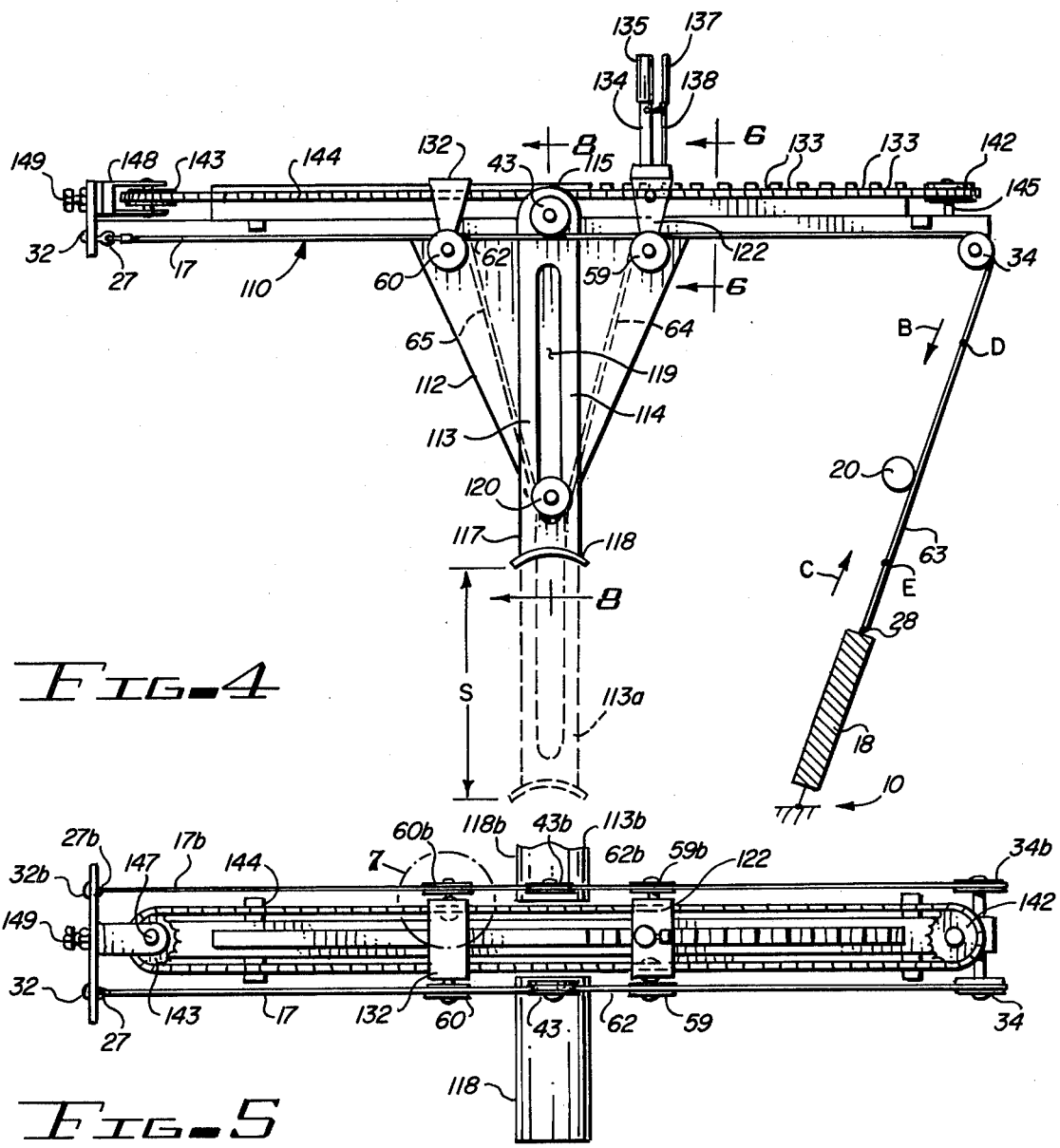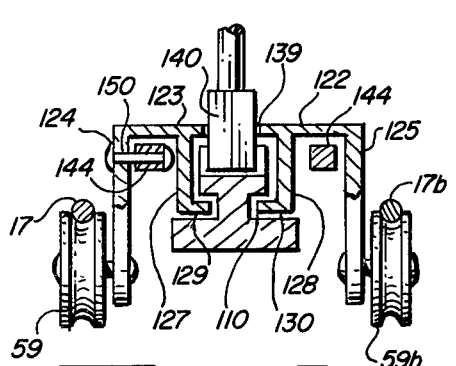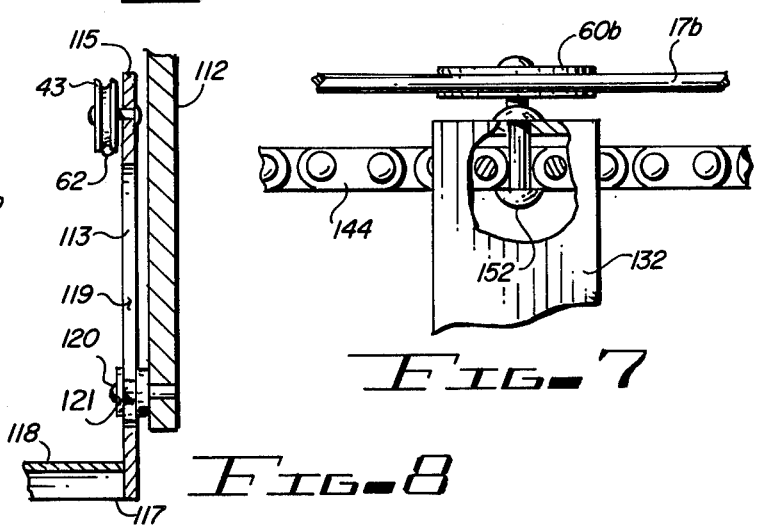

VARIABLE SPEED DRIVE UNIT

This invention relates to drive mechanisms.

In a further aspect, the present invention relates to spring drive mechanisms of the type which convert reciprocating input to unidirectional rotary output.

More particularly, the instant invention concerns a drive mechanism of the above type having a variable speed output.

Spring bias drive units and motors are well known in the prior art. A recent search of files conducted within the United States Patent and Trademark Office revealed the following issued U.S. Pat. Nos. 914,926—Comfort, 3,760,905—Dower, 837,815—Esch, 643,647—Harmon, 494,203—Herrington, 4,019,230—Pollard, 651,021—Silvey, 949,951—Zieg.

The foregoing references clearly establish the concept of a reciprocating input which opposes tension biasing means to provide a unidirectional rotary output.

While the several references show various structure and function related to the instant invention, U.S. Pat. No. 643,647 is considered to be of particular interest. Illustrated is a drive unit especially used in combination with a velocipede, bicycle or tricycle. Reciprocal movement of the pedals, energized by the rider, is translated into rotary motion of a drive wheel for propelling the craft.

Briefly, the drive unit includes an elongate flexible power transmission element in the form of a strap or cable which is secured at one end to a pedal and at the other end to a unidirectional drive element specified as a clutch or intermittent grip. Reciprocal motion of the pedal imparts reciprocal motion to the power transmission element. In response thereto, the unidirectional drive element urges rotation of the wheel. Reciprocal movement of the pedal by the rider is opposed by a spring.

Also of particular immediate interest is U.S. Pat. No. 3,760,905 which describes a drive unit which is generally analogous to the drive unit of U.S. Pat. No. 643,647. While the arrangement and the specific structure of the two devices have various differences, various similar and corresponding elements are apparent. The latter device, for example, includes an elongate flexible power transmission member in the form of a cable which is engaged with a unidirectional drive element. Referred to as a motor within the specification, the unidirectional drive element is in the form of a ratchet including a pawl which engages the teeth of a ratchet disk. A tension spring interconnects one end of the cable to the frame of the vehicle. It is also noted that the flexible power transmission element may include a chain and that the motor may include a sprocket.

U.S. Pat. Nos. 643,647 and 3,760,905, along with the other previously noted patents, serve to point out that drive units of the general type of the immediate invention are well known. Further, the references clearly establish that such drive units include inherent common components and elements which are well known and well defined. Accordingly, these elements can be referred to by generic terms, the specific definitions of which are to be found in the references.

Referring again to U.S. Pat. No. 643,647 included is a mechanism for varying the ratio between the length of the stroke of the pedal and the degree of rotation imparted to the clutch or drive wheel. Commonly, this is referred to as a variable speed drive. In the immediate device, the variable speed is accomplished by means of a speed changing pulley which is slidably mounted upon the pedal. While effectively changing the drive ratio, the arrangement is extremely inconvenient and cumbersome to operate, requiring that the rider of the velocipede stop, dismount and change the position of the pulley when it is desired to change speeds. This is considered to be an inherent limitation of the prior art.

Accordingly, it is an object of the present invention to provide an improved drive unit for use with vehicles or spring assisted motors.

Another object of the invention is the provision of an improved drive unit for translating reciprocal motion into rotary motion.

Another object of the invention is to provide an improved drive unit of the immediate type having speed changing capabilities.

Still another object of this invention is the provision of a drive unit having a readily variable ratio between the amplitude of the reciprocal input and the degree of rotation of the rotary output.

Yet another object of the invention is to provide a variable speed drive unit in which the ratio can be readily altered while the drive unit is in motion.

Yet still another object of the instant invention is to provide a variable speed drive unit which utilizes various prior art components.

A further object of the invention is the provision of a drive unit in which the prior art components thereof are more effectively arranged.

And a further object of the invention is to provide a drive unit which is relatively unencumbered representing an improvement over the prior art.

Still a further object of this invention is the provision of a variable speed drive unit which can be attached to various devices, such as the frame of a velocipede, without extensive modification of the device.

And still a further object of the invention is to provide a speed changing mechanism as above which is relatively economical to manufacture, durably constructed, and conveniently useable.

Briefly, to achieve the desired objects of the instant invention in accordance with a preferred embodiment thereof, the variable speed drive unit includes an elongate flexible power transmission member having a first end and a second end. The first end is affixed to the frame of the selected device, such as a bicycle, while biasing means, such as a tension spring, are interconnected between the second end and the frame. Intermediate the ends, the power transmission member includes a normally straight section which is angularly displaced in response to reciprocally movable power input means. The drive section of the flexible power transmission member, intermediate the normally straight section and the second end, is engaged with a unidirectional drive element for providing a rotary output.

As will be apparent from an understanding of the prior art devices, the unidirectional drive element is urged to rotate in response to oscillation of the power transmission member. In accordance with the instant invention, the power transmission member oscillates in response to angular deflection of the straight section thereof by the reciprocally movable input means. Further included in the immediate invention are a pair of guides, each carried by a traveler, which are movable in opposite directions along the normally straight section on either side of the point of attachment of the reciprocally movable input means to define a normally straight section of selectively variable length. Accordingly, the ratio between the degree of rotation of the unidirectional drive element and the fixed amplitude of the reciprocally movable input means is selectively variable. Means are provided for adjustably moving the guides while the drive unit is in motion.

The foregoing and further and more specific objects and advantages of the instant invention will become readily apparent to those skilled in the art from the following detailed description of a preferred embodiment thereof taken in conjunction with the drawings in which:

FIG. 4 is a semischematic side elevation view of an alternate embodiment of an improved variable speed drive unit embodying the principles of the instant invention;

FIG. 5 is a top plan view of the device in FIG. 4.

FIG. 6 is an enlarged vertical sectional view taken along the line 6—6 of FIG. 4.

FIG. 7 is an enlarged fragmentary section taken from within the broken line circle designated 7 in FIG. 5; and FIG. 8 is a fragmentary vertical sectional view taken along the line 8—8 of FIG. 4.

Figure 1:
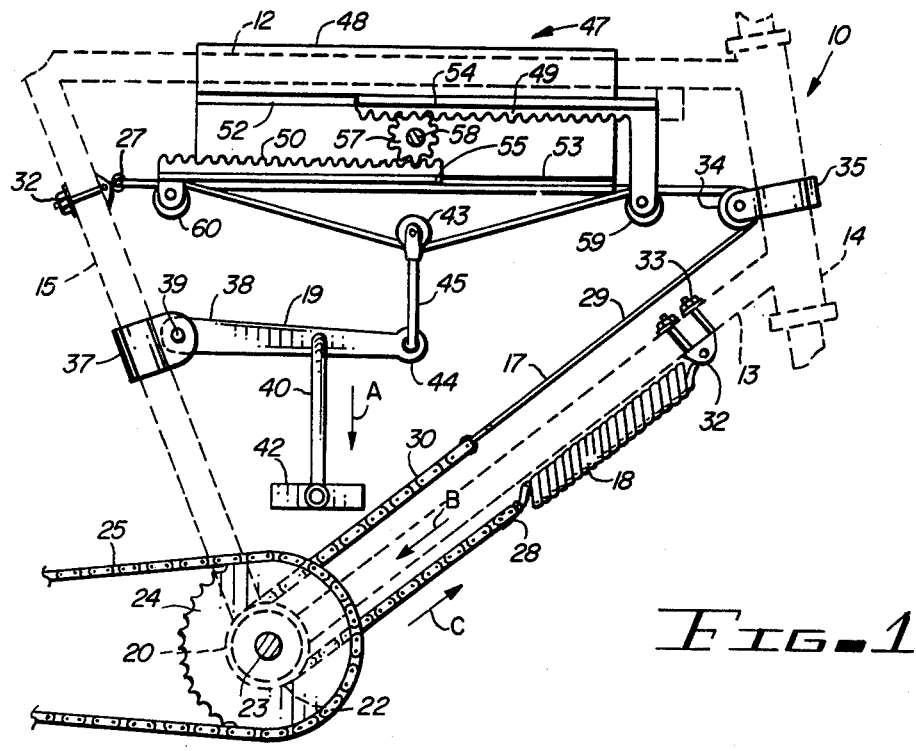
FIG. 1 is a side elevation view of an improved variable speed drive unit constructed in accordance with the teachings of the present invention as it would appear when attached to an appropriate device, herein specifically illustrated in broken outline as a fragmentary section of a conventional bicycle frame, the entire illustration being semischematic.

Turning now to the drawings in which like reference characters indicate corresponding elements throughout the several views. Attention is first directed to FIG. 1 which shows a conventional bicycle frame, shown in broken outline and generally designated by the reference character 10, and including upper, lower, forward and rearward tubular elements 12, 13, 14 and 15 respectively. The variable speed drive unit of the instant invention, attached to frame 10, includes an elongage flexible power transmission element 17, biasing means 18, reciprocally movable power input means 19 and unidirectional drive element 20.

Drive element 20 is located at the junction of lower tubular element 13 and rearward tubular element 15, the location at which is normally carried the drive sprocket and pedal arrangement of a conventional bicycle. Drive element 20 includes driven sprocket 22 and drive shaft 23 on which is mounted drive sprocket 24. Drive chain 25 engaged with drive sprocket 24 is connected with and urges rotation of the rear wheel of the bicycle in accordance with conventional practice. Drive unit 20 may be of the intermittent grip, clutch or ratchet type as thoroughly described and well known in the prior art. Other types of units to provide the immediate function will also readily occur to those skilled in the art.

Elongate flexible power transmission element 17 having first end 27 and second end 28 includes a cable section 29 and a chain section 30. First end 27 is secured to rearward tubular element 15 by eyebolt 32. Biasing means 18, herein specifically illustrated as a tension coil spring, is interconnected between second end 28 of the power transmission element and lower tubular element 13 of frame 10. For this purpose, bracket 32 is connected to one end of biasing means 18 and secured to tubular element 13 by U-bolts 33. At an intermediate position, cable section 29 passes through pulley 34 secured to forward tubular element 14 by bracket 35.

Reciprocally movable power input means 19 includes bracket 37 secured to rearward tubular element 15 and lever 38 pivotally secured at one end thereof to bracket 37 by pin 39. Arm 40 depending from lever 38 carries foot pedal 42 at the lower end thereof. Pulley 43 residing above cable section 29 is secured to the free end 44 of lever 38 by line 45.

In the immediate illustration downward pressure in the direction of arrow A has been applied to foot pedal 42 moving free end 44 of lever 38 and pulley 43 downwardly exerting pressure upon and angularly deflecting cable section 29 of flexible power transmission element 17. In response thereto, biasing means 18 has been extended. In the normal or rest position, i.e. absence of pressure upon pedal 42, biasing means 18 is relaxed in the contracted position applying tension to power transmission element 17 such that the portion of cable section 29 extending between first end 27 and pulley 34 is normally straight. Intermediate the second end 28 of power transmission element 17 and the normally straight portion thereof, chain section 30 which functions as the drive portion of power transmission element 17 is engaged with unidirectional drive element 20 by extending around driven sprocket 22.

In response to pressure applied to pedal 42 in the direction of arrow A, lever 38 rotates about pin 39 urging pulley 43 in the direction of arrow A and angularly deflecting the normally straight section of power transmission element 17. The angular deflection of the straight section causes the chain or drive section 30 to move in the direction of the arrowed line B extending biasing means 18. When the pressure upon pedal 42 is relaxed biasing means 18 contracts causing chain section 30 to move in the direction of arrowed line C. As a result thereof, power is supplied to the unidirectional drive element 20. It is seen therefore that the angular deflection of the normally straight section controls the amplitude of the oscillation of power transmission element 17 in the directions of arrowed lines B and C.

The movement of chain section 30 provides the power input to unidirectional drive element 20. It will be appreciated that movement in one direction, as indicated by arrowed line B or C, is the power stroke while movement in the other direction is the return stroke. It is unimportant within the context of the instant invention whether the power stroke is in the direction of arrowed line B in response to pressure upon pedal A, or in the direction of arrow C in response to the energy stored within biasing means 18.

Control means, generally designed by the reference character 47 and carried by frame 10, provide for selectively varying the effective length of the normally straight section of power transmission element 17 which is subject to angular deflection. Specifically, control means 47 includes housing 48 clamped or otherwise conveniently secured to upper tubular element 12 and depending therefrom. First and second travelers 49 and 50 are slidably carried by housing 48 for reciprocal movement along a path generally parallel to the normal straight section of power transmission element 17. In accordance with the immediate embodiment first and second travelers 49 and 50 are in the form of racks oriented to have the teeth in opposed facing relationship.

Racks are frequently mounted to be slidably movable and for this purpose various means will readily occur to those skilled in the art. As illustrated herein, an upper pair of guide slots 52 and a lower pair of guide slots 53 are formed in housing 48. Only one slot 52 and one slot 53 is actually illustrated, it being understood that housing 48 is shown in vertical crosssection having a mirror image side removed. A pair of tongues 54 and 55 extend along either side of travelers 49 and 50 respectively and are slidably held within respective pairs of grooves 52 and 53. The means for adjustably moving travelers 49 and 50 is a pinion 57 mounted upon shaft 58 which is rotatably carried in housing 48. Pinion 57 is concurrently engaged with the teeth of each rack defining travelers 49 and 50. In accordance with conventional practice, a handle is secured to shaft 58.

A first guide in the form of pulley 59 is carried by first traveler 49 while a second guide in the form of pulley 60 is carried by second traveler 50. It is immediately apparent that guides 59 and 60 are extendable and retractable in response to rotation and counter-rotation of pinion 57. The section of flexible power transmission member 17 subject to angular deflection, the normally straight section, is now defined as that section of element 17 lying between guides 59 and 60. The effective length of the straight section is selectively variable in accordance with rotation of shaft 58. It is especially pointed out that the handle associated with shaft 58 can be readily rotated by the rider of the bicycle without disruption of the normal riding and pedaling processes.

Figure 2:
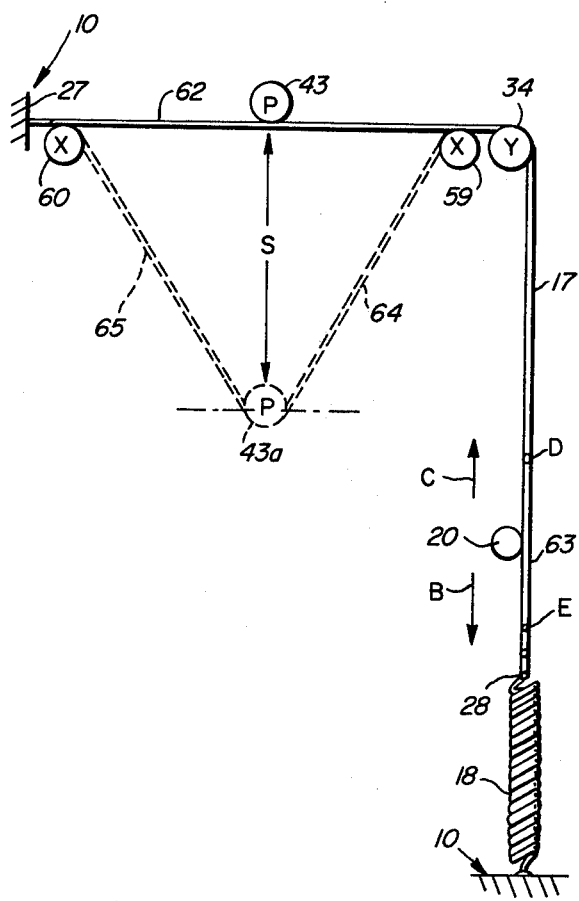
FIG. 2 is a schematic representation of the variable speed drive unit of FIG. 1 as it would appear when adjusted for low speed.

As seen in FIG. 2, guides 59 and 60 have been extended imparting maximum length to the normally straight section of flexible power transmission element 17. For purposes of reference, the normally straight section is identified by the reference character 62 and is defined as the distance between the points of tangency of element 17 with guides 59 and 60. The drive section of flexible power transmission element 17 is identified by the reference character 63 and has an effective working length, as will be explained further presently, defined as the distance between points D and E. Pulley 43 moves between an upper or relaxed position shown in solid outline and a lower or fully extended position shown in broken outline 43A. The distance between 43 and 43A designated S is the stroke, which is the fixed limit of travel of pedal 42.

Pulley 43 is engaged in an intermediate point of straight section 62. Accordingly as pulley 43 is moved toward the extreme position 43A, straight section 62 is angularly deflected in the form of an isosceles triangle having legs 64 and 65. In order to provide for the ever increasing length of legs 64 and 65 biasing means 18 is extended drawing second end 28 closer to guide 59 and storing energy within biasing means 18. When pressure upon pulley 43 is relaxed, biasing means 18 contracts returning section 62 to the normally straight configuration.

Figure 3:
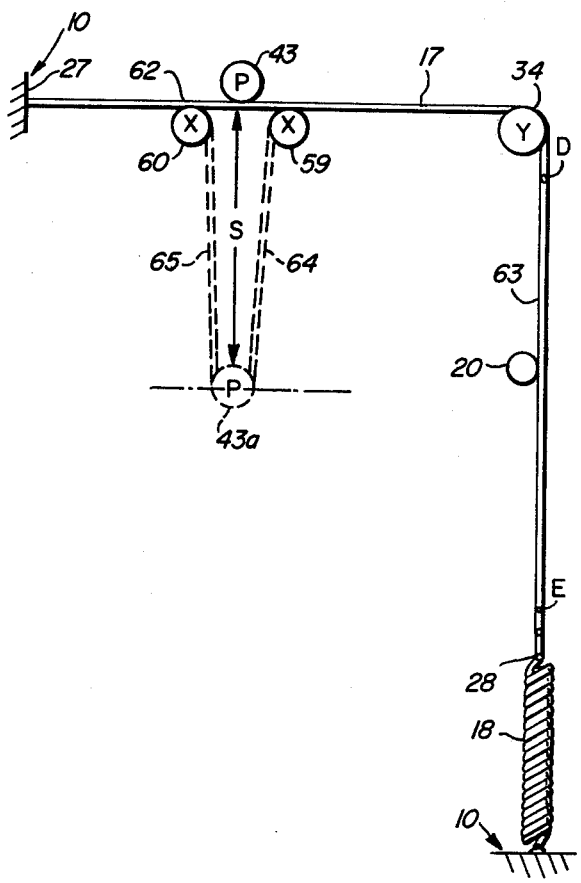
FIG. 3 is a schematic representation of the variable speed drive unit of FIG. 1 as it would appear when adjusted for high speed.

During movement of flexible drive element 17, the length of drive section 63 passes drive element 20 imparting rotation thereto. The drive cycle during which energy is imparted to drive element 20 may either be during the downward movement of pulley 43 or, alternatively, during the contraction of biasing means 18. As seen in FIG. 3, guides 59 and 60 have been moved from the position of FIG. 2 to a position close to pulley 43, greatly diminishing the length of normally straight section 62. The effective length of drive section 63, measured between points D and E, is proportionally extended. Accordingly, a greater degree of rotation is imparted to drive element 20.

In accordance with the foregoing description, it is immediately apparent that the effective length of drive section 63 determines the degree of rotation imparted to drive element 20 during each power stroke. The angular deflection of flexible power transmission element 17, as determined by the angular deflection of normally straight section 62, controls the effective length of drive section 63. Resultingly, the ratio between the length of stroke S and the degree of rotation of drive element 20 is made variable by control means 47, which is readily adjusted to selective positions while the drive unit is in motion.

Another important feature of the instant invention is the fact that drive section 63 does not move at a constant rate relative to drive element 20. That is, assuming a constant speed of movement for pulley 43. As pulley 43 moves downwardly, the rate of movement of drive section 63 is accelerated. This allows initial movement of pedal 42 under light load, which load increases as momentum of the pedal builds. This provides a definite advantage when used in connection with bicycles and other self-powered vehicles.

FIG. 4 illustrates an alternate embodiment of the instant invention utilizing various previously described components. Such components are designated by the previously used common reference characters. The speed control means of the immediate embodiment are carried by an elongate frame member 110 which may be part of a larger frame unit such as previously described frame 10.

Bracket 112, as further seen in FIG. 8, carries slidably movable pedal assembly 113. Pedal assembly 113 includes elongate arm 114 having upper end 115 and lower end 117. Pulley 43 is carried at upper end 115 while foot pedal 118 extends outwardly from lower end 117. An elongate slot 119 is formed through arm 114, extending longitudinally thereof and having closed ends. Post 120 secured to bracket 112 includes a groove 121 which interacts with slot 119 for attachment of pedal assembly 113 to bracket 112 and for sliding movement relative thereto.

Accordingly, pedal assembly 113 moves between an upper or relaxed position shown in solid outline and a lower or fully extended position shown in broken outline 113A. The movement of pedal assembly 113 establishes stroke S as described in connection with the foregoing embodiment. A mirror image pedal assembly 113b including foot pedal 118b and pulley 43b is carried on the other side of frame member 110.

As particularly seen in FIG. 5, the immediate embodiment includes a first elongate flexible drive element 17 as seen in FIG. 4 and a second elongate flexible drive element designated by the reference character 17b on the other side of frame member 110. Components associated with drive element 17b and corresponding to components associated with drive element 17 are designated by similar reference characters and include the suffix b.

Turning now to FIG. 6, it is seen that guide pulleys 59 and 59b are carried by generally U-shaped traveler 122 having center section 123 and depending legs 124 and 125. Depending from the center section 123 are downwardly and inwardly directed guide members 127 and 128 which are received in grooves 129 and 130 respectively within frame member 110. Traveler 122 is generally equivalent to first traveler 49 as previously described. A second traveler 132 generally similar in construction is also slidably movable along frame member 110 and carries guide pulleys 60 and 60B.

A plurality of notches are formed in the top side of frame member 110 along the path traversed by first traveler 122. A handle 134 having hand grip 135 at the upper end thereof extends upwardly from first traveler 122. A conventional detent mechanism, of the type frequently associated with hand brake mechanisms and as will be readily understood by those skilled in the art, is associated with first traveler 122 and specifically carried by lever 134. Briefly, the detent mechanism includes an arcuately upturned gripping element 137 which is pivotally connected to handle 134. Detent rod 138 is pivotally connected at the upper end thereof to gripping element 137 and extends through opening 139 in center section 132 having a lower end 140 which is sized and shaped to be received within notches 133.

In view of the foregoing description, it is apparent that first traveler 122 can be moved along frame member 110 to any selected location. The limits of travel of traveler 122 are generally defined by pulleys 43 and 34. To affect movement, the operator simply grasps hand grip 135 and gripping element 137, and squeezing, withdraws end 140 of detent rod 138 from the immediate notch 133. Hand grip 135 is then moved to the newly selected position and upon release of pressure from gripping element 137, end 140 enters the respective notch 133 to retain traveler 112 at the newly selected position.

As will now be disclosed, second traveler 132 cooperatively moves in an opposite direction concurrent with the movement of first traveler 122. First and second sprockets 142 and 143 are carried proximate opposite ends of frame member 110. First bracket 142 is carried proximate the end to which pulley 34 is affixed while second sprocket 143 is adjacent bracket 32. Continuous chain 144 encircles sprockets 142 and 143 and is drivingly engaged therewith. It is noted that pulley 142 is carried by shaft 145 the position of which is fixed relative frame member 110. Second sprocket 143 is rotatably carried upon shaft 147 extending through bifurcated bracket 148. Bifurcated bracket 148 is movable by virtue of adjusting screw 149 for purposes of tensioning endless chain 144.

As seen in FIG. 6, a first traveler 122 is secured to chain 144 by any suitable means such as pin 150 which extends through leg 124 and an opening as commonly found in drive chains of the type illustrated. As seen in FIG. 7, second traveler 132 is similarly secured to chain 144 by pin 152. It is noted that the pins 150 and 152 securing first traveler 122 and second traveler 132 respectively to chain 144 are on opposite sides of frame member 110. Hence, as one traveler moves in one direction, the opposite traveler is forced to move in the other direction. Chain 144 acts as a timing mechanism and ensures that the travelers move in corresponding increments which are equally spaced on opposite sides of pulley 43. Function and other aspects of the instant embodiment are analogous to the embodiment previously described in detail in connection with FIGS. 1–3.

Various modifications and changes to the device herein chosen for purposes of illustration will readily occur to those skilled in the art. In this regard, it is to be understood that the path of flexible drive element 17 as seen in FIGS. 1 and 4 was chosen for purposes of illustration only. Other paths are equally apparent. In order to take full advantage of the available power output, when the device is used in connection with a bicycle, a second drive unit as used in connection with the embodiment of FIGS. 4–8 may be positioned to the drive unit illustrated in FIG. 1 and also supply power to shaft 23. Preferably, the cycle of operation of the second drive unit is 180 degrees out of phase with the first unit. To the extent that such modifications and variations do not depart from the spirit of the invention, they are intended to be included within the scope thereof which is assessed only by a fair interpretation of the following claims.

Having fully described and disclosed the present invention in such clear and concise terms as to enable those skilled in the art to understand and practice the same, the invention claimed is:

1. A variable speed drive unit for translating reciprocal motion into rotary motion and for selectively changing the ratio between the amplitude of the reciprocal motion and the degree of rotation of the rotary motion while said drive unit is in operation, said variable speed drive unit comprising:
   (a) a frame,
   (b) an elongate flexible power transmission member having,
      a. a first end secured to said frame,
      b. a second end,
      c. a normally straight section intermediate said ends, and
      d. a drive section intermediate said straight section and said second end;
   (c) biasing means interconnected between the second end of said power transmission member and said frame for exerting tension upon said member;
   (d) means for angularly deflecting said straight section thereby urging reciprocal movement of said drive section;
   (e) a unidirectional drive element engaged with said drive section of said power transmission member and providing a unidirectional rotary output in response to the movement of said drive section; and
   (f) control means carried by said frame for selectively varying the angular deflection of said straight section of said power transmission member.

2. The variable speed drive unit of claim 1, wherein control means includes:
   (a) a first traveler carried by said frame and reciprocally movable along a path generally parallel to said straight section of said power transmission member; and
   (b) a guide carried by said first traveler and engaged with the straight section of said power transmission member.

3. The variable speed drive unit of claim 2, wherein said control means further includes:
   (a) a second traveler carried by said frame and reciprocally movable along a path generally parallel to the straight section of said power transmission member; and
   (b) a second guide carried by said second traveler and engaged with the straight section of said power transmission member, said first guide and said second guide residing on opposite sides of the intermediate point of said straight section,
   the length of said straight section being defined as the distance between said guides.

4. The variable speed drive unit of claim 3, wherein said control means further includes adjusting means engaged with said first traveler and with said second traveler for concurrently and oppositely moving said guides.

5. The variable speed drive unit of claim 4, wherein
(a) said first traveler includes a first rack;
(b) said second traveler includes a second rack opposed to and spaced from said first rack; and
(c) said adjusting means includes,
   i. a pinion rotatably carried by said frame and drivingly engaged with said first rack and with said second rack.

6. The variable speed drive unit of claim 4 further including:
(a) a plurality of notches spaced along said frame; and
(b) a manually operable detent mechanism carried by one of said travelers and engagable with a selected one of said plurality of notches.

7. The variable speed drive unit of claim 4, wherein said adjusting means further includes:
(a) a first sprocket carried by said frame;
(b) a second sprocket carried by said frame and spaced from said first sprocket with said travelers movable between said first sprocket and said second sprocket;
(c) an endless chain encircling said first and said second sprockets and having first and second oppositely moving sections;
(d) means for securing said first traveler to the first second of said chain; and
(e) means for securing said second traveler to the second section of said chain.

8. In a drive mechanism comprising an elongate flexible power transmission element supported by at least two spaced-apart support members and coupled to a unidirectional drive element so as to convert reciprocal motion of at least a portion of said elongate flexible power transmission element to rotary motion at said unidirectional drive element, a variable speed drive apparatus comprising:
means for reciprocating said elongate flexible power transmission element by angularly deflecting same between at least two of said spaced apart support members; and
means for selectively varying the distance between said at least two spaced apart support members while said elongate flexible power transmission element is in at least one of the states of reciprocation and rest.

* * * * *